United States Patent [19]
Gearhart

[11] 3,815,423
[45] June 11, 1974

[54] HYDROSTATIC ALTIMETERS AND METHODS OF USE

[75] Inventor: Walter S. Gearhart, College, Pa.

[73] Assignee: Ametek, Inc., New York, N.Y.

[22] Filed: May 27, 1971

[21] Appl. No.: 147,448

[52] U.S. Cl. ............... 73/432 HA, 37/DIG. 19
[51] Int. Cl. ............... G01c 9/22, G01c 5/04
[58] Field of Search ......... 73/432 HA, 387; 33/209; 37/DIG. 19, DIG. 20

[56] References Cited
UNITED STATES PATENTS

| | | | |
|---|---|---|---|
| 1,957,730 | 5/1934 | Riddle | 73/387 |
| 2,703,985 | 3/1965 | Jackson | 73/432 HA |
| 2,851,799 | 9/1958 | Meents et al. | 73/432 HA |
| 3,330,045 | 7/1967 | Selleck | 33/209 |

OTHER PUBLICATIONS
Cumrine et al. "Geophysics" July 1951 Vol. XVI No. 3 pages 486–493

Primary Examiner—S. Clement Swisher
Attorney, Agent, or Firm—Smythe & Moore

[57] ABSTRACT

Ruggedized hydrostatic altimeters for determination of elevation differentials of construction equipment have specific features designed to withstand hard shocks, constant vibration, and sharp decelerations — a fully compliant sensor diaphragm, a constant volume, normally-closed gauge protection valve, and a manually rotatable gauge dial. A modified model for contour surveying includes (1) length markings along the connecting tubing to enable true horizontal distance readings and (2) a faired arrow-shaped sensor configuration to facilitate pulling over rough terrain. Special methods of use are associated with these features.

37 Claims, 13 Drawing Figures

PATENTED JUN 11 1974 3,815,423

INVENTOR
Walter S. Gearhart
By Robert F. Custard
ATTORNEY

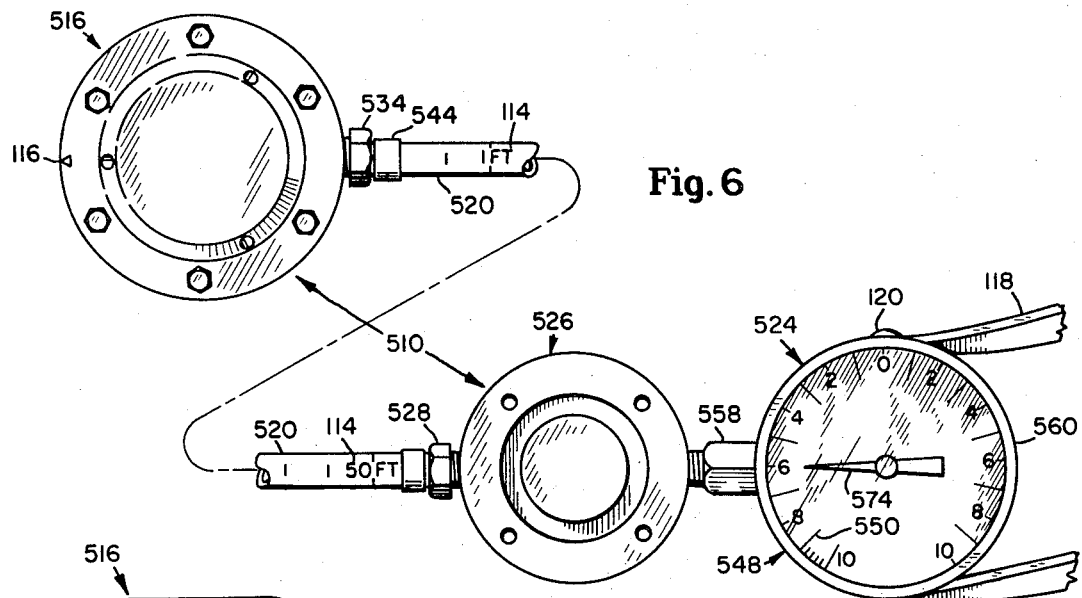
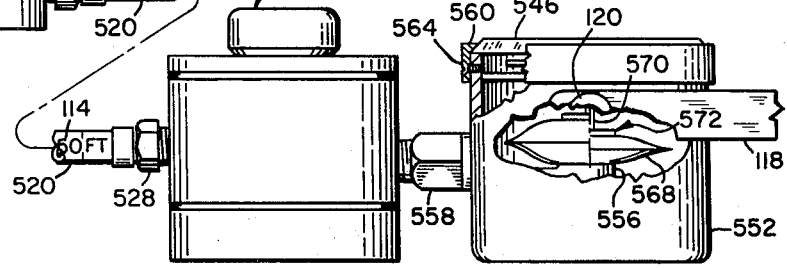
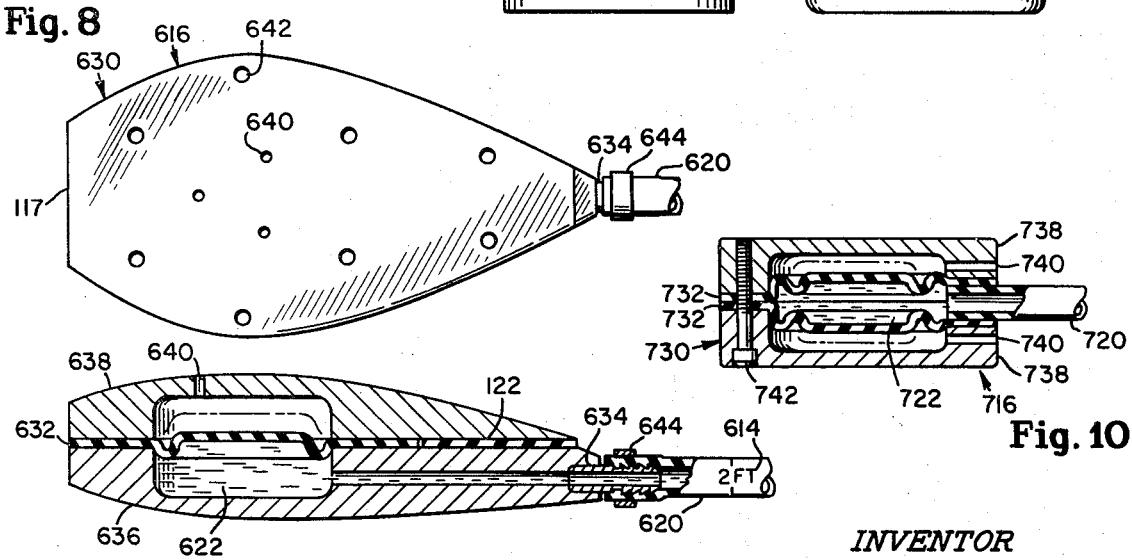

PATENTED JUN 11 1974　　3,815,423

INVENTOR
Walter S. Gearhart
By *Robert F. Custard*
ATTORNEY

HYDROSTATIC ALTIMETERS AND METHODS OF USE

BACKGROUND OF THE INVENTION

FIELD OF THE INVENTION

The present invention relates to apparatus and methods which provide a means of obtaining the elevation of one point relative to another, or alternatively, obtaining both the elevation difference and the horizontal distance between two points. The apparatus operates on a hydrostatic principle and consists of a reservoir or sensor assembly communicating with a pressure gauge by means of flexible tubing. The liquid system within this apparatus is solid filled with an incompressible liquid and has no free surface open to the atmosphere.

A specific object of the invention is the provision of a ruggedized hydrostatic altimeter which can be mounted on an excavation machine, such as a backhoe, with the sensor assembly mounted on the dipperstick and subject to extremes of shock, vibration, and deceleration. In conjunction with this objective, specific methods of using this altimeter during excavation operations are set forth which save time and provide continuous digging operations under the control of one machine operator.

An additional object of the invention is the provision of a ruggedized hydrostatic altimeter which can be used for topographical surveying. In conjunction with this objective, the sensor assembly and connecting tubing of this altimeter are provided with an initiation point on the sensor assembly and markings along the connecting tubing starting from this initiation point with which to determine the true horizontal distance between points during the method of determining the elevation differentials between these parts. In order to facilitate use by a single surveyor, the sensor assembly is configured to be generally arrow-shaped to permit pulling through underbrush and across rough terrain without snagging or damage.

The provision of a ruggedized altimeter for the purpose of excavation control or topographical surveying includes an entirely compliant sensor diaphragm and a gauge protection valve. In addition, for the excavation use, a manually rotatable gauge dial is utilized. Further, for those applications in topographical surveying where horizontal distances are also to be determined, distance markings initiating from a point on the sensor assembly are provided along the connecting tubing.

DESCRIPTION OF THE PRIOR ART

The prior patents most pertinent to applicant's apparatus and methods are U.S. Pat. Nos. 1,099,385; 1,369,235; 2,577,021; 2,672,758; 2,703,985; 2,709,920; 2,844,037; 2,851,799; and 3,494,202; which will be grouped as to structure or operation and discussed below.

U.S. Pat. Nos. 1,099,385; 1,369,235; 2,703,985; and 3,494,202 have at least one end of an incompressible fluid filled system open to the atmosphere in an unconfined manner. This requires that a fixed orientation of the open reservoir be maintained or the system fluid would be lost by spillage. In cases of sudden acceleration, oscillation of the fluid in the system and reservoir could ingest air into the otherwise solid liquid filled lines. These disclosed devices would be limited to those applications where random orientation of the reservoir or severe shocks and accelerations to the system are not encountered. Applicant avoids these limitations by utilizing an entirely compliant diaphragm to confine the liquid in the system.

The apparatus disclosed in U.S. Pat. No. 2,851,799 utilizes two spring loaded bellows as sensors. The use of two spring loaded bellows requires that the two bellows must maintain a linear correlated movement with elevation and pressure changes and must be initially sized and calibrated to insure such correlated action. More importantly, the location of a fluid filled bellows having a linear spring rate at the end of a system which is subject to shock and acceleration such as in backhoe excavation or dragging over terrain in contour surveying as proposed by applicant is not practical since the inertia of the mass of the fluid contained in the lower sensor bellows, upon the event of severe decelerations, will momentarily overload the bellows and alter its initial spring rate. Applicant uses only one spring element, the gauge assembly diaphragm, which is in the portion of the apparatus which is relatively quiescent and is protected by a normally-closed valve except when the sensor assembly is also quiescent.

The apparatus disclosed in U.S. Pat. No. 2,844,037 uses a pressurized system of an incompressible fluid. If the internal volume changes, the internal pressure will change due to volume change. This volumetric change would occur in the Bourdon tube as it straightens out. Applicant's system has atmospheric pressure referenced both on the external surface of the compliant diaphragm at the sensor assembly and at the external surface of the diaphragm of the gauge assembly, while the disclosed system is referenced to atmospheric pressure at only the exterior of the Bourdon tube, and is internally pressurized.

The system disclosed in U.S. Pat. No. 2,709,920 differs from the patents discussed above and the applicant's invention in that an auxiliary high pressure air tank is required. Both air and liquid are fed into the system, the air supply being used to maintain pressure on the liquid surface, and the liquid is bled and exhausted from the system in the process of monitoring elevational changes. The need to periodically refill both the liquid and air tanks are features which would make this disclosed system unsuitable in the applications for which applicant's invention is designed.

The disclosure of U.S. Pat. No. 2,557,021 shows three embodiments utilizing:

1. a confined compressible gas in one leg of the system without a means to keep the gas and the liquid from mixing should the reservoir be subject to random orientations or accelerations;
2. gauges at both ends of the systems which is not practical for systems where one end of the system is subject to severe shock and violent deceleration as proposed by applicant; and
3. a reservoir requiring a fixed orientation to prevent mixing of the gas and liquid therewithin, and in addition, a sealed evacuated gauge case.

U.S. Pat. No. 2,672,758 discloses improvements over the apparatus disclosed in U.S. Pat. No. 2,557,021. The two embodiments disclosed utilize:

1. a dual line pressurized system; and
2. a single line pressurized system, primarily to eliminate hysteresis.

In a more general aspect, the present practice in excavation operations does not utilize any of these disclosed types of hydrostatic altimeters, relying upon a man holding a calibrated rod in the trench and sighting to a reference string line with a hand held level. This procedure is both costly and time consuming since an additional man is required to perform this operation or the machine operator must dismount from his machine and perform the grade checking operation. Further, for large scale projects, laser systems are available in the price range of five thousand dollars, but requiring sophisticated installation, alignment, calibration, and maintenance.

Similarly, the present practice in topographical surveying does not utilize hydrostatic altimeters, relying upon the conventional practice of obtaining vertical and horizontal increments for defining topographical contours. This current practice requires at least two men, a calibrated level rod, a linear tape measure, and a hand held level device. The men progress over the terrain in successive increments, but must sight with the level device back to the rod each time to determine elevation differentials. Linear horizontal distance is measured by taking a reading when the tape measure is estimated to be held on a level plane. In rugged terrain with dense foliage, visual sightings are difficult to obtain and the aforementioned equipment cumbersome to transport, position, and align.

To summarize the pertinent patented prior art and the present commercial practice, there is no commercially available hydrostatic altimeter device for application to either topographical surveying or excavation equipment such as backhoes. The limitations of the prior art disclosures discussed above are considered to have prevented the commercialization of such devices. Applicant's invention is directed to the elimination of the prior art complexities and the incorporation of novel features to overcome the operational deficiencies of the discussed patented prior art and the present commercial practice.

SUMMARY

The apporach utilized by the applicant has been
1. to design a ruggedized hydrostatic altimeter which can withstand the rigors of topographical surveying and construction excavation operations without maintenance or calibration;
2. to simplify both the construction and methods of use for such altimeters so that they may be used by the average workman without extensive training; and
3. to produce a product which will gain ready acceptance in the commercial market by overcoming the limitations of the prior art devices.

The present invention includes a first embodiment of hydrostatic altimeter with a gauge assembly having the novel feature of a manually rotatable dial assembly which can be set and will retain the setting until reset. Frictional engagement with the gauge casing with an O-ring therebetween provides easy manipulation and yet certain retention of the desired setting. In addition, the gauge assembly includes a gauge protection valve which is spring biased to a normally-closed position and manually operable to provide fluid communication with the sensor assembly only when operated to an open position, thereby protecting the gauge mechanism from the constant and widely fluctuating pressure changes generated by the random orientation and frequent movements of the sensor assembly. In order to eliminate leakage of air from the ambient atmosphere into this valve and also to eliminate distortion of gauge readings, a constant volume valve with a pair of liquid filled communicating recesses permit the manual actuation of the valve without the displacement of liquid from the valve and with no leakage.

The sensor assembly of applicant's invention includes a main novel feature in that the flexible member or diaphragm is entirely compliant, thereby eliminating the problems inherent with prior art devices which utilized metallic bellows which, while quite accurate, have a spring rate which must be correlated with the diaphragm or other flexible member in the gauge assembly. While the spring rate of the sensor assembly flexible member can be compensated for in the calibration of the dial markings, both metallic and rubber-like materials deteriorate with repeated extreme distensions and, especially in a rugged environment subject to repeated sudden decelerations, gradually change their spring rate or deform in a manner to take a permanent set, and thereby become ineffective for altimeter sensor assembly utilization.

An additional feature of applicant's apparatus is that the exterior surfaces of the flexible elements of both the gauge assembly and the sensor assembly are open to the ambient atmospheric pressure at all times, thereby compensating for atmospheric pressure changes which may occur during a series of correlated elevation determinations taken over an extended period of time.

An additional embodiment of applicant's apparatus directed to the topographical surveying art includes the above features of the sensor assembly and the gauge protection valve, but the rotatable dial is not necessary and a compound gauge is utilized to read zero to ten feet elevation differentials with either the sensor assembly or the gauge assembly at the higher elevation. Further, the sensor assembly exterior housing may be shaped in a generally arrow-shaped faired configuration with the point thereof centered upon the adjacent portion of the connecting tubing, thereby minimizing snagging and tubing stresses during the operation of pulling the sensor assembly over rough terrain and through dense underbrush. Also, in those assemblies where it is desirable to measure true horizontal distances during the operation of determination of elevational differentials, the sensor assembly is provided with an initiation point, preferably a tangential flat area, on the side opposite the connecting tubing. The tubing connected to these assemblies is provided with distance markings starting from the initiation point and showing feet and tenths of feet from the initiating point and continuing along the tubing to the gauge assembly, thereby permitting a true horizontal distance measurement with the tubing stretched taut and the gauge assembly reading a zero elevation differential.

Minor variations of the sensor assembly include a protective cover or a protective ring, a double diaphragm riveted-seal assembly with either protective covers or protective rings on each side, and a double diaphragm adhesive-seal assembly with protective covers or rings similar to those used on the double diaphragm riveted-seal assembly, the advantage of the adhesive-seal construction being in cheaper mass production costs with equivalent operating characteristics.

The combination of at least some of the above novel features in a ruggedized hydrostatic altimeter, namely:

1. gauge protective valve,
2. entirely compliant, no spring-rate sensor assembly diaphragm,
3. rotatable dial on gauge assembly,
4. arrow-shaped sensor configuration, and
5. tubing markings, permit installations of such altimeters on excavation equipment subject to rigorous use, and the use of such altimeters for topographical surveying over rugged terrain and through dense underbrush, thereby permitting the use of novel methods both in grade checking operations during excavation by a single machine operator without dismounting from the machine being used for excavation, and in obtaining both vertical and horizontal distance increments in topographical surveying operations.

The methods of excavation depth termination include 1. grade check with
   (a) the adjacent earth as reference and
   (b) an adjacent grade-line string as reference, and
2. elevation determination from a predetermined remote reference point within sight of the excavation machine operator. The methods of topographical surveying include
1. point to point elevation differential determination with a single workman, and
2. point to point elevation differential determination and true horizontal measurement between the same points with a two man surveying operation.

BRIEF DESCRIPTION OF THE DRAWINGS

The objectives of the invention and the manner in which it is carried out will be apparent from the following description and the accompanying drawings, wherein:

FIG. 6 is a plan view of a hydrostatic altimeter embodying an additional embodiment of the invention for use in topographic surveying.

FIG. 7 is a side view of the altimeter of FIG. 6, with portions broken away to show details of construction.

FIG. 8 is a plan view of a third additional embodiment of a sensor assembly for use with the altimeter shown in FIGS. 6 and 7.

FIG. 9 is a central sectional side view of the sensor assembly of FIG. 8.

FIG. 10 is a sectional side view of a fourth additional embodiment of a sensor assembly for use with the altimeters of applicant's invention.

DESCRIPTION OF THE PREFERRED EMBODIMENTS

Figure 1:
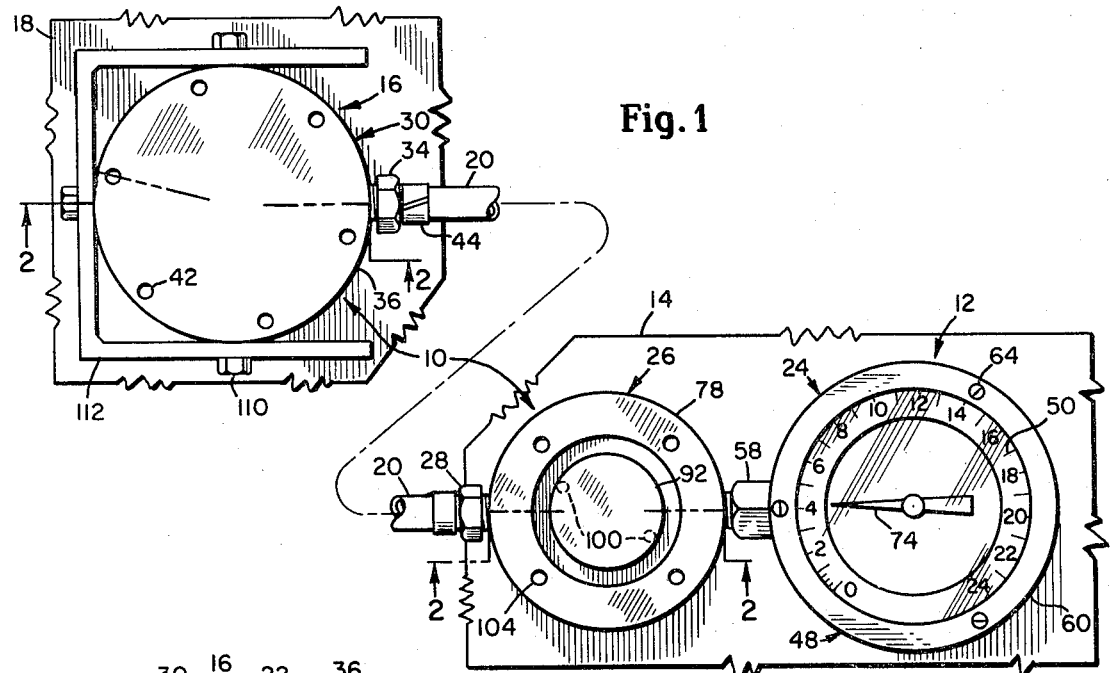
FIG. 1 is a plan view of a hydrostatic altimeter embodying the invention for use with excavation equipment with portions of a backhoe shown to illustrate mounting details.
Figure 2:
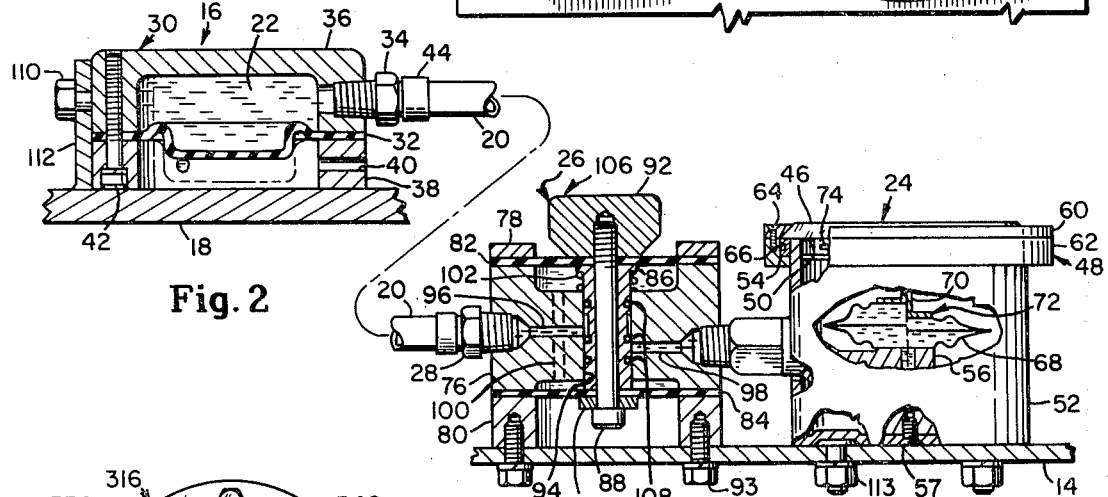
FIG. 2 is a partially sectional side view of the altimeter of FIG. 1.

Referring to FIGS. 1 and 2, a ruggedized hydrostatic altimeter 10 mounted on the adjacent portions of a backhoe is shown, including a gauge assembly 12 mounted on a portion of an instrument panel 14, a sensor assembly 16 mounted on a portion of a dipper stick 18, a length of flexible tubing 20 connecting gauge assembly 12 and sensor assembly 16, and the internal liquid volumes thereof solid filled with an incompressible liquid 22. Gauge assembly 12 includes a gauge 24, a gauge protection valve 26, and a liquid connector 28 connected to tubing 20. Sensor assembly 16 includes a protective housing 30, a displaceable pressure sensitive sensor element 32, and a liquid connector 34 connected to tubing 20. Protective housing 30 includes a cup-shaped reservoir 36 with six threaded assembly holes therein and a threaded hole to receive connector 34, and a cylindrical protective ring 38 with three equally spaced atmospheric vent holes 40 therethrough and six counterbored assembly holes to mate with the assembly holes in reservoir 36. Sensor element 32 is an entirely compliant diaphragm which is flexible but does not stretch or have a stress buildup. The sensor element 32 which applicant has been using is known as a "Bellofram Seal" BELLOFRAM is a trademark of Bellofram Corp. and is composed of rubber reinforced with nylon fibers. Synthetic rubbers and other rubber-like materials, such as "Buna-N," reinforced with nylon or other flexible fibers may be used to make sensor element 32, however element 32 must be fully compliant to the extent that no substantial pressure is exerted on the fluid system contained by element 32 by the distortion of element 32 itself, and sensor element 32 must not deteriorate or take a permanent set after repeated subjection to stress, vibration, and shock. Sensor element 32 has six equally spaced holes therein to mate with the assembly holes in reservoir 36 and ring 38. Six recessed socket screws 42 are provided to assemble reservoir 36 and ring 38 with sensor element 32 sealed therebetween. It will be understood that means for fastening sensor assembly 16 other than screws 42 may be utilized, such as rivets, bolts and nuts, adhesives, and rolled or crimpled assemblies. While connector 34 is shown as a threaded pipe connector with tubing 20 secured thereon by a crimped retaining ring 44, it will be understood that connector 34 may be a unitary portion extending from reservoir 36 with tubing 20 secured thereon by any desired fastening means. Incompressible liquid 22 fills the internal liquid volume of sensor assembly 16, and vent holes 40 expose the external surface of sensor element 32 to ambient atmospheric pressure at all times.

Referring further to FIGS. 1 and 2, gauge 24 is a commercially available diaphragm actuated, low pressure, vacuum gauge which has been modified (1) to provide a dial 46 which is calibrated to read the elevation differential (in feet) between gauge 24 and sensor assembly 16 when connecting tubing 20 is filled with incompressible liquid 22, and (2) to provide a manually rotatable dial ring assembly 48 so that assembly 48 including dial 46 (a) may be rotated with respect to the other portions of gauge 24, (b) may be set at a zero reading, and (c) will maintain the set rotary position until again manually rotated to a new position. The original calibration of dial 46 is obtained empirically by positioning gauge assembly 12 and sensor assembly 16 at relative elevation differentials with sensor assembly 16 at the lower position at all positions between zero elevation differential and the desired maximum depth of operation. Altimeter 10, shown in FIGS. 1 and 2, is calibrated from 0 to 24 feet with dial markings 50 every 3 inches. Incompressible liquid 22 may be any incompressible liquid which has a low vapor pressure, a substantially constant viscosity and density in the range of temperatures to be encountered in operation, and in addition must not freeze at the lowest temperature at which altimeter 10 is to be used or stored. Suitable liquids which have been used are deaerated water, ethylene glycol, and propyl alcohol. A preferred composition consists of equal portions by weight of deaerated water and ethylene glycol which has a specific gravity of approximately 1.07 when related to the density of water. The terms "specific gravity approximately that of water" used in the claims are intended to cover the specific gravities of the three liquids set forth above and combinations thereof, and specifically to exclude heavy liquids such as mercury which is not adapted for use in applicant's apparatus.

Referring now to FIG. 2, gauge assembly 12 includes casing 52, mounting ring 54 secured thereon with solder or adhesive, a gauge casting 56 which includes a liquid connector 58 and tapped holes to secure casting 56 to casing 52. Liquid connector 58 extends through a suitable hole in casing 52 which is slightly larger than connector 58, thereby exposing the inside of casing 52 to ambient atmospheric pressure at all times. Dial ring assembly 48 includes dial 46, retaining ring 60, mounting ring 62 and three flat head screws 64 securing ring 60 to ring 62. Preferably, dial 46 is secured to ring 60 by adhesive and dial markings 50 are on the underside of dial 56. An O-ring 66 is positioned in a suitable recess in ring 54 between rings 54 and 62 to provide positive frictional engagement therebetween. Secured to the upper portion of casting 56 is a displaceable pressure sensitve element 68 communicating with connector 58 through a hole in casting 56. Element 68 includes two symmetrical convoluted metallic diaphragms and is conventional in the gauge art. Attached to the upper surface of element 68 is a central shaft 70 of an indicating movement assembly 72 which is correlated to a rotatable pointer 74 rotating about an axis of rotation perpendicular to dial 46. Casing 52 is broken away in the central portion for illustrative purposes to show a central cross-section of element 68 with the right half contracted to a full scale reading position and the left half expanded to a zero scale reading position.

While the elevation differential of gauge assembly 12 and sensor assemnbly 16 is referred to in the specification and claims herein, it will be understood that the intended reference is to the center-of-pressure of the liquid retained therein and that applicant's invention is directed to that portion of the altimeter art wherein the slight foreshortening inaccuracies caused by the partial rotation of sensor assembly 16 will not be significant in the elevations being measured, being of the order of one half of one percent at the maximum. Applicant is striving for accuracy on the order of one percent.

Referring further to FIG. 2, gauge protection valve 26 includes a main valve body 76, upper retaining ring 78, lower retaining ring 80, resilient diaphragms 82 and 84, a central spool 86 with three O-ring recesses and a shallow fluid recess, an assembly screw 88, a sealing washer 90, and an actuator button 92. Lower retaining ring 80 has two tapped holes with which valve 26 is secured to instrument panel 14 with screws 93. Main valve body 76 has a main central bore 94 and two transverse bores 96 and 98 intersecting bore 94. Bores 96 and 98 terminate at their outer ends in threaded holes which in turn connect to connectors 28 and 58 to complete the fluid path through valve 26. In addition, body 76 has two symmetrically positioned small vertical bores 100 which merely connect the upper and lower recesses thereof. A spring 102 maintains spool 86 in a normally closed position unless actuator bottom 92 is depressed permitting fluid pressure to be transmitted between bores 96 and 98. Elements 76, 78, 80, 82, and 84 are retained in a fluid tight sealed position by four rivets 104. Actuator assembly 106 includes central spool 86 with three O-rings 108 in the O-ring recesses, spring 102, assembly screw 88, sealing washer 90, and actuator button 92 threaded on screw 88 to maintain a fluid tight seal. Valve 26 is actuated without volumetric displacement, therefore there is no inaccuracy in the gauge assembly readings introduced by valve actuation. Other commercially available normally-closed, nondisplacing valves may be used in place of valve 26. Tubing 20 may be of any convenient length and in practice will be tailored to the model of backhoe for which altimeter 10 is designed. However, tubing 20 is secured to the adjacent portions of the backhoe with clips or clamps to prevent whipping and snagging. Sensor assembly 16 is mounted on the surface of a dipper stick 18 by three screws 110 which are threaded into three tapped holes in reservoir 36. A U-shaped mounting bracket 112 is welded to dipper stick 18 and has three holes therethrough with which screws 110 mate to provide a secure assembly. Gauge 24 is mounted on instrument panel 14 by two threaded studs welded to depressions in the bottom of casing 52. Nuts 113 are threaded upon these studs to provide a secure assembly. It will be understood that the end of tubing 20 attched to connector 28 will be secured by a crimped retaining ring similar to ring 44 on the other end of tubing 20 or other retaining means. Tubing 20 may be of any flexible rubber or rubber-like plastic material, but is preferably one-eighth inch I.D., one-half inch O.D. "Buna-N" hose with a fabric reinforcement. "Buna-N" is a synthetic rubber product readily commercially available. Tubing 20 may also be of "Saran" SARAN, a polyvinylidene chloride resin, is a trademark of Dow Chemical Co., which is a polyvinylidene chloride. Diaphragms 82 and 84 may be of either resilient rubber or rubber-like gasket materials or of thin convoluted metallic material. O-rings 66 and 108 are of conventional form and materials. Sensor element 32 has been discussed in detail above. The remaining elements of applicant's apparatus may be formed of conventional materials as taught in the prior art of gauges and valves, with the provision that those elements in direct contact with liquid 22 should not corrode or deteriorate when in contact therewith. Exemplary materials are stainless steels, bronze, and copper. Dial 46 may be of glass or clear "unbreakable" plastic. It should be noted that the internal liquid volumes of gauge assembly 12, including valve 26 and its two reservoirs formed between diaphragms 82 and 84 and valve body 76; sensor assembly 16; and tubing 20 must be solid filled with incompressible liquid 22 and suitable additional vacuum and liquid connectors may be provided to facilitate the filling of the altimeter assembly as is well known in the art. For certain altimeters which utilize more expensive ruggedized gauges, valve 26 will not be required, and gauge assembly 12 would incude only gauge 24 and connector 58, with tubing 20 connected directly to connector 58. Therefore, it should be understood that the term gauge assembly as used herein is not limited to units which include a gauge protective valve 26.

Referring further to FIGS. 1 and 2, the operation of altimeter 10 designed for use with excavation equipment will be understood from the functional description of the major components. Gauge assembly 12 has an internal liquid volume and includes casing 52. Displaceable pressure sensitive element 68 is connected to casing 52 by casting 56, and two flat head screws 57 connect casting 56 to casing 52. Element 68 has an external surface and partially defines extended and contracted liquid volumes corresponding to zero scale and full scale internal pressures respectively. The difference in these volumes is a gauge differential volume. The external surface of element 68 is exposed to ambient atomspheric pressure at all times. Liquid connector 58 is connected to casing 52 by casting 56. Indicating movement assembly 72 is connected to casing 52 and correlated with element 68 to indicate the displacement of element 68 by the rotation of rotatable pointer 74 which is connected to indicating movement assembly 72. Dial ring assembly 48 includes dial 46 concentric with the axis of rotation of rotatable pointer 74. Gauge assembly 12 has a portion 54 having the configuration of a body of revolution. Dial ring assembly 48 has a portion mating with the body of revolution portion of gauge assembly 12 and in frictional engagement therewith. Dial ring assembly 48 is readily rotatable on gauge assembly 12 by manual manipulation. Gauge assembly 12 includes a low-pressure, normally-closed, liquid valve means 26 connected to casing 52. Valve means 26 is manually actuatable to an open position, is solid filled with incompressible liquid 22 and when open, is in direct liquid communication with tubing 20 and element 68 of gauge assembly 12. The delicate portions of gauge assembly 12 are thereby isolated from liquid pressure fluctuations in tubing 20 by valve means 26 when valve means 26 is in a normally-closed position.

Sensor assembly 16 has an internal liquid volume and includes protective housing 30. Liquid connector 34 is connected to housing 30. Displaceable pressure sensitive sensor element 32 is connected to housing 30. Element 32 has an external surface and partially defines extended and contracted liquid volumes corresponding to full scale and zero scale internal pressures respectively. The difference in these volumes of sensor assembly 16 is a sensor assembly differential volume and is equal to the gauge differential volume. Element 32 has at least an intermediate portion which is fully compliant to the extent that no substantial pressure is exerted on the system by the distortion of element 32 at any pressure between full scale pressure and zero pressure. The external surface of element 32 is exposed to ambient atmospheric pressure at all times.

Tubing 20 connects connector 28 of gauge assembly 12 to connector 34 of sensor assembly 16. Tubing 20, and the internal liquid volumes of gauge assembly 12 and sensor assembly 16 are solid filled with incompressible liquid 22 having a specific gravity approximately that of water. Dial 46 of gauge assembly 12 is calibrated to register the elevation differential between gauge assembly 12 and sensor assembly 16 and is calibrated to be equivalent to the hydrostatic pressure differential of a corresponding depth of incompressible liquid 22. The reading on dial 46 represents the true vertical distance between the elevation of gauge assembly 12 and the elevation of sensor assembly 16.

Figure 3:
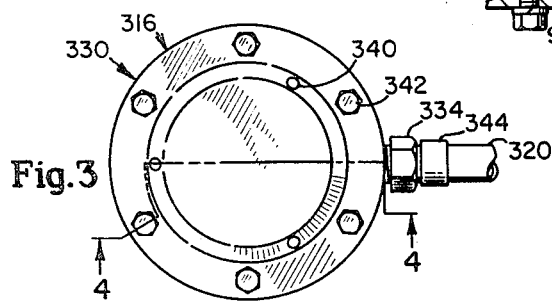
FIG. 3 is a plan view of a first additional embodiment of a sensor assembly for use with the altimeter of applicant's invention.
Figure 4:
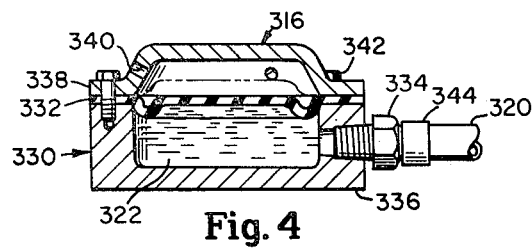
FIG. 4 is a sectional side view of the sensor assembly of FIG. 3.

Referring now to FIGS. 3 and 4, a first additional embodiment of sensor assembly is shown. Sensor assembly 316 is similar to sensor assembly 16 in function, the primary difference being a protective cover 338 in place of ring 38 to provide protection for sensor element 332 when the cover side of the assembly is positioned facing away from the dipper stick, or when assembly 316 is used with an altimeter for surveying purposes. Each of the functionally equivalent elements is identified with reference characters that are 300 larger than the equivalent element in FIGS. 1 and 2. Therefore, elements 316, 320, 322, 330, 332, 334, 336, 338, 340, 342, and 344 correspond to the associated elements 16, 20, 22, 30, 32, 34, 36, 38, 40, 42, and 44 in FIGS. 1 and 2.

Figure 5:
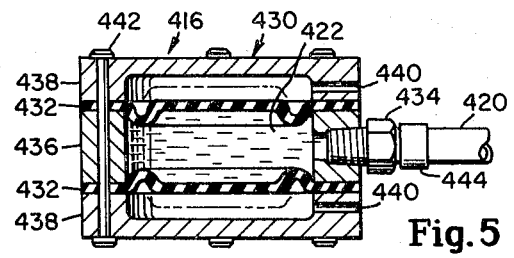
FIG. 5 is a sectional side view of a second additional embodiment of a sensor assembly for use with the altimeters of applicant's invention.

Referring now to FIG. 5, a cross section of a second additional embodiment of sensor assembly is shown, with the sectional view being taken along a cutting plane similar to that shown in FIGS. 3 and 4. Sensor assembly 416 is similar to sensor assembly 316, the primary differences being (1) two sensor elements 432 and (2) riveted fasteners 442 in place of screws 342. Each of the functionally equivalent elements is identified with reference characters 400 larger than the equivalent elements in FIGS. 1 and 2. Therefore, elements 416, 420, 422, 430, 432, 434, 436, 438, 440, 442, and 444 functionally correspond to the associated elements 316, 320, 322, 330, 332, 334, 336, 338, 340, 342, and 344 in FIGS. 3 and 4.

Referring to FIGS. 6 and 7, a ruggedized hydrostatic altimeter 510 embodying applicant's invention adapted for contour surveying is shown. Each of the functionally equivalent elements is identified with reference characters 500 larger than the equivalent elements in FIGS. 1 and 2.

Sensor assembly 516 is identical to sensor assembly 316 shown in FIGS. 3 and 4 except for the addition of an origination point 116. Valve 526 is identical to valve 26 shown in FIGS. 1 and 2. Tubing 520 is similar to tubing 20, but has the addition of tubing markings 114. Tubing markings 114 are imprinted upon tubing 520 in any convenient manner, as by hot embossing or other printing means. Markings 114 are measured from an origination point 116 directly opposite from liquid connector 534. Sensor assembly 516 together with tubing 520 therefore form a convenient surveyor tape for measuring horizontal distances. Tubing 520 may be of any convenient length, lengths of 30 feet and 50 feet having been used with complete success. Gauge 524 is similar to gauge 24 but with two significant differences: (1) dial ring assembly 548 is not rotatable on casing 552 and dial 546 and dial markings 550 are so calibrated that a contracted element 568 positions pointer 574 to read full scale counter-clockwise; an expanded element 568 reads full scale clockwise; and pointer 574 has a half-way zero point corresponding to a displacement of element 568 half-way between contracted and expanded positions, all of which is conventional in the gauge art, and commonly referred to as a compound gauge which will read either pressure or vacuum. Applicant's gauge 524 is shown to read positive or negative elevational displacements up to 10 feet in either direction, with dial markings every two tenths of a foot. Dial 546 is secured to ring 560 and ring 560 is fastened to casing 552 with two mounting screws 564. Elements 546, 548, 550, 552, 558, 560, 564, 568, 570, 572, and 574 functionally correspond to elements 46, 48, 50, 52, 56, 58, 60, 64, 68, 70, 72, and 74 of the gauge assembly shown in FIGS. 1 and 2. Rivets 120 are attached to casing 552 to fasten a supporting strap 118 which facilitates the carrying and use of altimeter 510.

Referring to FIGS. 8 and 9, a third additional embodiment of sensor assembly is shown, specifically adapted for use with altimeters such as altimeter 510 for use in dense underbrush and for pulling over rough terrain. Sensor assembly 616 is functionally equivalent to sensor assembly 516, but has the external surface thereof faired and formed into a generally arrow-shaped configuration with the point of the arrow directed toward the adjacent portion of tubing 620 and centered thereon. Flat surface 117 on the side opposite connector 634 serves as an origination point for markings 614. In addition, connector 634 is hard soldered into a bore in reservoir 636 rather than being a threaded pipe fitting. In order to facilitate fabrication, an additional resilient gasket element 122 is utilized so that element 632 will not be any wider than necessary. Element 122 is the same thickness as element 632 and may be of the same material. Eight rivets 642 are used in place of six screws 42 in order to eliminate stress on the faired arrow portion. Each of the functionally equivalent elements is identified with reference characters 600 larger than the equivalent elements in FIGS. 1 and 2. Elements 620, 622, 630, 632, 634, 636, 638, 640, 642, and 644 functionally correspond to elements 20, 22, 30, 32, 34, 36, 38, 40, 42, and 44 of the sensor assembly shown in FIGS. 1 and 2.

Referring further to FIGS. 3, 4, 6 and 7, the altimeter 510 for use in contour surveying comprises a gauge assembly including gauge 524 and valve 526, sensor assembly 516, and tubing 520. The gauge assembly has an internal liquid volume and includes casing 552. Displaceable pressure sensitive element 568 is connected to casing 552 by casting 556. Element 568 has an external surface and partially defines extended and contracted liquid volumes corresponding to positive and negative full scale internal pressures respectively. The difference in these volumes is a gauge differential volume. The external surface of element 568 is exposed to ambient atmospheric pressure at all times. Liquid connector 558 is connected to casing 552. Indicating movement assembly 572 is connected to casing 552 and correlated with element 568 to indicate the displacement of element 568 from a zero pressure midpoint by the rotation of rotatable pointer 574 connected to indicating movement assembly 572. Dial ring assembly 548 is connected to casing 552 and includes a compound dial 546 concentric with the axis of rotation of rotatable pointer 574. Low-pressure, normally-closed, liquid valve means 526 is connected to casing 552 and is manually actuatable to an open position; is solid filled with incompressible liquid; and when open, is in direct liquid communication with tubing 520 and element 568. The delicate portions of gauge 524 are isolated from liquid pressure fluctuations in tubing 520 by valve 526 when valve means 526 is in a normally-closed position. Sensor assembly 516 has an internal liquid volume and includes protective housing 330. Liquid connector 534 is connected to housing 330. Displaceable pressure sensitive sensor element 332 is connected to housing 330. Element 332 has an external surface and partially defines extended and contracted liquid volumes corresponding to full scale positive and full scale negative internal pressures respectively. The difference in these volumes of sensor assembly 516 is a sensor assembly differential volume and is equal to the gauge differential volume. Element 332 has at least an intermediate portion thereof which is fully compliant to the extent that no substantial pressure is exerted on the system by the distortion of element 332 at any pressure between full scale positive and full scale negative pressures. The external surface of element 332 is exposed to ambient atmospheric pressure at all times. Tubing 520 connects connector 528 to connector 534 of sensor assembly 516. Tubing 520 includes length markings 114 along its entire length. Protective housing 330 includes a surface 116 from which markings 114 of tubing 520 are initiated. Sensor assembly 516 together with tubing 520 functions as an accurate flexible surveying tape. Tubing 520 and the internal liquid volumes of gauges 524, valve 526, and sensor assembly 516 are solid filled with an incompressible liquid having a specific gravity approximately that of water. Dial 546 of gauge 524 is calibrated to register the elevation differential between gauge 524 and sensor assembly 516 and is calibrated to be equivalent to the hydrostatic pressure differential of a corresponding depth of this incompressible liquid. The reading on dial 546 represents the true vertical distance between the elevation of gauge 524 and the elevation of sensor assembly 516.

Referring now to FIGS. 6 and 7, and especially FIGS. 8 and 9, protective housing 630 of sensor assembly 616 has a portion adjacent liquid connector 634 having a faired generally arrow-shaped configuration with the point of the arrow-shaped configuration directed toward the adjacent portion of flexible tubing 620 and centered thereupon. Sensor assembly 616 may be pulled by tubing 620 through dense underbrush and over rough terrain without snagging or excessive stress upon tubing 620. It will be understood that sensor assemblies configured as sensor assembly 616 may be utilized in applicant's altimeters designed for surveying purposes. Further, the double element designs of FIGS. 5 and 10 may also be used with the arrow-shaped design of FIGS. 8 and 9.

Referring now to FIG. 10, a fourth additional embodiment of sensor assembly is shown, with the sectional view being taken along a cutting plane similar to that shown in FIGS. 3 and 4. The sensor assembly 716 is functionally equivalent to sensor assembly 416 shown in FIG. 5 but with the liquid seal provided by adhesives or heat joining of the two elements 732 and the similar joining of elements 732 to tubing 720 by adhesive or heat to provide a unitary flexible assembly of two elements 732 and tubing 720. In this embodiment, assembly screws 742 serve merely to provide a unitary protective housing 730 rather than to also provide the fluid tight seal required of attaching means 42, 342 and 642, thereby reducing the cost of mass production.

Referring further to FIGS. 5 and 10, sensor assemblies 416 and 716 include a second displaceable pressure sensitive sensor element which is similar to element 92 and symmetrically positioned with respect thereto. It will be understood that such double element designs may be utilized in applicant's altimeters for both excavation equipment and surveying purposes.

Referring now to FIGS. 1, 2, 12, and 13, the operation and function of applicant's altimeters designed for excavation equipment purposes will be understood from the description of an altimeter installed on such equipment. An excavation machine 126 comprises a machine body structure 128, an operator station 130 on body structure 128, a boom 132 connected to body structure 128, a dipper stick 18 pivoted to boom 132, a bucket 134 pivoted to dipper stick 18 by a bucket pivot 136, and controls 138 operable from operator station 130 for manipulating dipper stick 18 and bucket 134. Altimeter 10 is mounted on machine 126. The details of gauge assembly 12, sensor assembly 16, and tubing 20 and their correlation have been described above in conjunction with FIGS. 1 and 2. Gauge assembly 12 is mounted on body structure 128 within sight and manipulation distance of operator station 130. Preferably, gauge assembly 12 is mounted on instrument panel 14 of machine 126. Sensor assembly 16 is mounted on dipper stick 18 immediately adjacent bucket pivot 126. Preferably, sensor assembly 16 is mounted with screws 110 to a U-shaped bracket 112 which is welded to the flat surface of dipper stick 18 and is positioned with element 32 toward dipper stick 18 for protection, as shown in FIGS. 1 and 2. Length of tubing 20 connects gauge assembly 12 to sensor assembly 16 and is secured to the adjacent parts of machine 126 at points along its length with clips or clamps 140 to prevent whipping and snagging.

Figure 11:
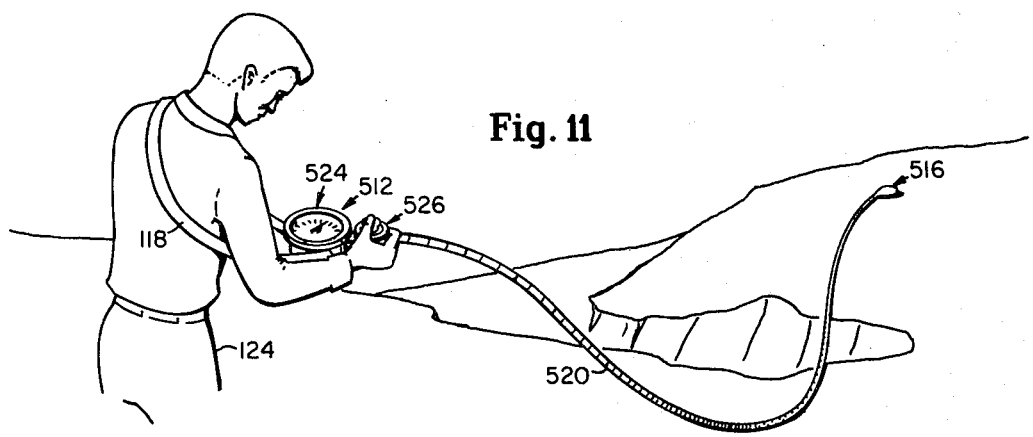
FIG. 11 is a perspective view of a surveyor utilizing the hydrostatic altimeter shown in FIGS. 6 and 7.

Referring now to FIGS. 6, 7, and 11, the method of operation and utilization of applicant's apparatus for topographic surveying will be described. Altimeter 510 is carried by a surveyor 124, preferably by strap 118, with gauge 524 and valve 526 at a height for easy manipulation. For a single elevation determination, sensor assembly 516 is positioned at a first location at a first elevation; gauge 524 and valve 526 are positioned at a second location at a second elevation, with the second location a substantial horizontal distance from the first location; valve 526 is manually operated to an open position and maintained in an open position until gauge 524 indicates a stable condition by a fixed location of indicating pointer 574; and then gauge 524 is read to obtain a true reading of the elevation differential between the first elevation and the second elevation. It will be understood that the second elevation illustrated will include the height of gauge 524 from the ground upon which surveyor 124 is standing and at the start of surveying operations, a reading will be taken with sensor assembly 516 at the feet of surveyor 124 to determine this constant "working height" and this height will be subtracted from the readings of gauge 524 to obtain the ground elevation differential between sensor assembly 516 and gauge 524. It is also a common practice to place gauge 524 on a 3 to 4 foot mounting stick and merely subtract this known distance from each gauge reading.

When a series of elevation differentials are to be determined, sensor assembly 516 is relocated from the first location to the second location; sensor assembly 516 is positioned at the second location at the second elevation; gauge 524 and valve 526 are repositioned at a third location at a third elevation, this third elevation usually being a substantial horizontal distance from both the first location and the second location; valve 526 is manually operated to an open position and maintained in an open position until gauge 524 indicates a stable condition; then gauge 524 is read to thereby obtain a true reading of the elevation differential between the second elevation and the third elevation; and the readings of gauge 524 obtained at the second location and at the third location are added to obtain the elevation differential between the first elevation and the third elevation. It will be understood that sensor assembly 516 may be relocated by carrying it from the first location to the second location and similarly to the third location, however, preferably relocation will be accomplished by pulling tubing 520 until sensor assembly 516 is obtained at the next location, thereby eliminating walking time and increasing the area covered by a surveyor in a given time period. Whenever the sensor assembly is to be relocated by pulling on the tubing, it is desirable to substitute a sensor assembly such as sensor assembly 616 shown in FIGS. 8 and 9 for the sensor assembly 516. The protective housing 636 of sensor assembly 616 has a portion adjacent liquid connector 634 having a faired generally arrow-shaped configuration with the point of the arrow-shaped configuration directed toward the adjacent portion of flexible tubing 620 and centered thereupon, whereby sensor assembly 616 may be pulled by tubing 620 through dense underbrush and over rough terrain without snagging or excessive stress upon tubing 620.

The above surveying methods utilize a single surveyor 124 or a team of surveyors to speed up the repositioning of the elements of altimeter 510 between the readings of gauge 524.

Referring now to FIGS. 6, 7, 8, and 9, whenever it is desired to obtain true horizontal distances between the locations for which elevation differentials are being obtained, an altimeter must be utilized that has an origination point or surface on the sensor assembly, such as 116 on sensor assembly 516 or 117 on sensor assembly 616, and markings on the tubing, such as 114 on tubing 520 and 614 on tubing 620. The markings will start from the origination point and together with the flexible tubing will serve as a convenient surveyor's tape. Referring now to FIGS. 6 and 7, for those applications where it is desired to obtain both horizontal and vertical measurements, the above methods will be modified to include the following method steps: while sensor assembly 516 is at the first location and gauge 524 is at the second location; valve 526 is operated manually to an open position; while maintaining valve 526 in open position, and maintaining the first location and the second location, either gauge 524 or sensor assembly 516 is repositioned vertically until gauge 524 and sensor assembly 516 are repositioned to the same elevation as indicated by a zero reading on gauge 524; while maintaining the same elevation for gauge 524 and sensor assembly 516, tubing 520 is stretched taut at the same elevation and the length markings 114 thereon are read, thereby obtaining a true horizontal distance reading between the first location and the second location; while sensor assembly 516 is at the second location and guage 524 is at the third location, the above steps are repeated to obtain a true horizontal distance reading between the second location and the third location; and then the readings of length markings 114 on tubing 520 taken at the second location and at the third location are added to obtain the total horizontal distance between the first location and the third location.

Figure 12:
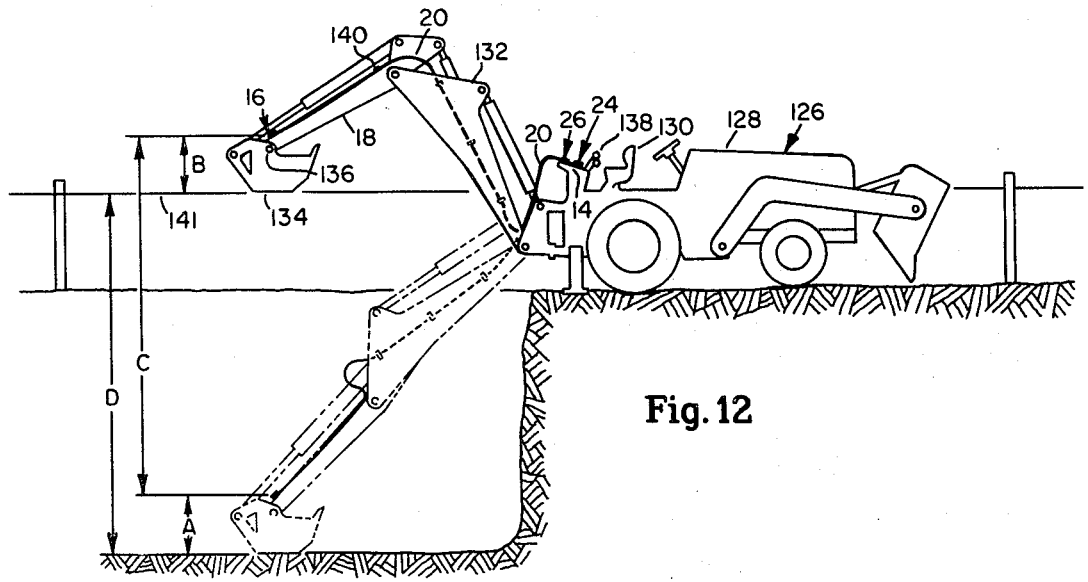
FIG. 12 is a diagrammatic side view of an excavation machine with the altimeter shown in FIGS. 1 and 2 mounted thereon and illustrating the bucket positions necessary for applicant's method of excavation depth determination during excavation operations measured from a grade line.

Referring to FIG. 12, excavation machine 126, such as a backhoe, with a body structure 128, has an operator station 130, a boom 132, a dipper stick 18 pivoted to boom 132, a bucket 134 pivoted to dipper stick 18 by bucket pivot 136, controls 138 to manipulate dipper stick 18 and bucket 134, an instrument panel 14, and an altimeter 10 of applicant's invention installed thereon. Sensor assembly 16 is fastened to the flat surface of dipper stick 18; gauge assembly 12, comprising gauge 24 and valve 26 is mounted on instrument panel 14 within sight and manipulation distance of operator station 130; and flexible tubing 20 is fastend to the adjacent portions of machine 126 with clamps or clips 140, in practice often clamped to the hydraulic control lines for dipper stick 18 and bucket 134. A predetermined grade line 141 near the excavation is maintained taut between two posts, and may be rope or wire. It will be noted that machine 126 is positioned with the bottom of bucket 134 parallel to grade line 141 and at the same elevation, while a second position is shown in phantom line with the bottom of bucket 134 resting on the bottom of the excavation.

Figure 13:
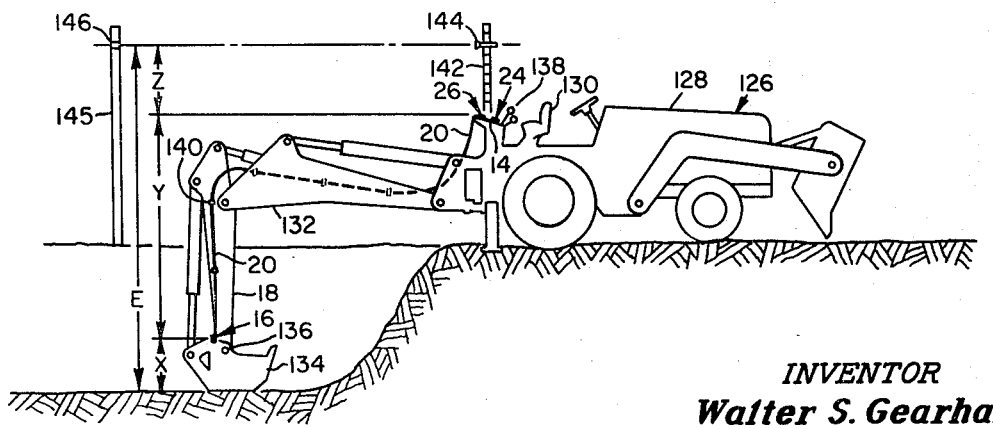
FIG. 13 is a diagrammatic side view of an excavation machine with the altimeter shown in FIGS. 1 and 2 mounted thereon and illustrating the bucket position necessary for applicant's method of excavation depth determination during excavation operations measured from a predetermined reference point.

Referring now to FIG. 13, excavation machine 126 is the same as the machine in FIG. 12; however, a reference point 146 on a reference pole 145 serves as the predetermined elevation from which all measurements are taken. A measuring stick 142 and a hand held sight level 144 are also required. Each total depth E will be comprised of the measurements: X - the height of sensor assembly 16 above the bottom of bucket 134 when the bucket 134 has its bottom horizontal with the bucket 134 resting on the bottom of the excavation; Y - the elevation differential read directy on gauge 24; and Z - the remaining vertical distance which is read from stick 142 at the point where level 144 is at the same elevation as point 146, determined by sighting.

Referring now to FIGS. 1, 2, and 12, the method of operation and utilization of applicant's altimeters for depth determination during excavation operations will now be set forth. An excavation machine 126 is provided, having an operator station 130, a boom 132 connected to machine 126, a dipper stick 18 pivoted to boom 132, a bucket 134 pivoted to dipper stick 18 by a bucket pivot 136, and controls 138 operable from operator station 130 for manipulating dipper stick 18 and bucket 134. An altimeter 10 is mounted on machine 126, and comprises a gauge assembly 12 mounted on machine 126 within sight and manipulation distance of operator station 130; a sensor assembly 16 mounted on dipper stick 18 immediately adjacent bucket pivot 136; a length of flexible tubing 20 connecting gauge assembly 12 to sensor assembly 16 secured to the adjacent parts of machine 126 at points along its length to prevent whipping and snagging; and tubing 20, gauge assembly 12, and sensor assembly 16 are solid filled with an incompressible liquid having a specific gravity aproximately that of water. A predetermined grade line 141 adjacent to the excavation from which to measure the desired depth of excavation is provided, and conveniently may be two posts with a cord or wire stretched therebetween. A portion of the excavation is dug with machine 126; controls 138 are manipulated to position bucket 134 in a first rotary position at a first location and at a first elevation with a portion of bucket 134 at the elevation of predetermined grade line 141, and while maintaining the first rotary position, the first location, and the first elevation, dial assembly 48 of gauge assembly 12 is manipulated to a zero setting; controls 138 are manipulated to reposition bucket 134 to a second rotary position which is parallel to the first rotary position and at a second elevation vertically in line with and below the first location with the portion of bucket 134 which was at grade line 141 now resting on the bottom of the excavation; and while maintaining the second rotary position and the second elevation, dial assembly 48 of gauge assembly 12 is read to directly determine the depth of the excavation from predetermined grade line 141.

It will be understood that the earth at the edge of the excavation may be used as the grade line if the depth of excavation is desired to be measured from the adjacent earth surface, such as where a minimum depth of earth coverage is necessary to keep lines from freezing or to comply with construction ordinances. In addition, in order to prolong the life of altimeter 10, gauge assembly 12 may include a manually actuatable, normally-closed valve 26 adjacent dial assembly 48, and the following steps included in the methods of elevation determination. Immediately prior to manipulating dial assembly 48, valve 26 is actuated to an open position and maintained in an open position at least until dial assembly 48 of gauge assembly 12 indicates a stable condition; and immediately prior to reading dial assembly 48 of gauge assembly 12, valve 26 is actuated to an open position and maintained in an open position at least until dial assembly 48 of gauge assembly 12 indicates a stable condition.

Referring further to FIG. 12, it will be noted that the readings of gauge assembly 12 will give the distance C, while the desired distance is distance D. However, since the distances A and B are maintained very nearly the same by keeping the rotary positions of bucket 134 parallel, the distances C and D will differ only by the foreshortening of the distance the center-of-pressure of sensor assembly 16 is above bucket pivot 136. This foreshortening is of the magnitude of one half inch at a maximum and therefore the desired distance D is measured well within the desired accuracy of 1 inch.

Referring now to FIG. 13, the method of depth determination for excavation operations from a predetermined reference point will be set forth. The excavation machine 126 and altimeter 10 mounted thereon are the same as previously described in cnjunction with FIG. 12. However, a pole 145 with a predetermined reference elevation point 146 marked thereon is provided within sight of the excavation, and a calibrated measuring stick 142 and a hand held sight level 144 are required. Stick 142 may have a starting end which has an initial end reading of one inch so that the actual point where the calibrations are measured from will be at the center-of-pressure of the fluid within gauge assembly 12. A portion of an excavation is dug with machine 126; controls 138 are manipulated to locate bucket 134 with the bottom thereof on the bottom of the excavation and to rotate bucket 134 to a predetermined rotary position wherein the bottom of bucket 134 is a known vertical distance X below sensor assembly 16, and while bucket 134 is maintained in this rotary position on the bottom of the excavation, dial 46 of gauge assembly 12 is read to directly determine the vertical displacement distance Y from sensor assembly 16 to gauge assembly 12; measuring stick 142 is placed in a vertical position with the lower end on dial 46 of gauge assembly 12; level 144 is placed adjacent stick 142 and sighted therethrough to position level 144 perpendicular to stick 142 and at the level of reference elevation point 146; calibrated stick 142 is read to determine the vertical remaining distance Z from dial 46 of guage assembly 12 to reference elevation point 146; and known vertical distance $X$, vertical displacement distance $Y$, and vertical remaining distance $Z$ are added to determine the true depth of the bottom of the excavation from reference elevation point 146.

Referring further to FIG. 13, in most applications it will be desirable to include a manually actuatable, normally-closed valve 26 adjacent dial 46 within gauge assembly 12, and for those applications, the following additional method step: immediately prior to reading dial 46 of gauge assembly 12, valve 26 is actuated to an open position and maintained in an open position at least until dial 46 of gauge assembly 12 indicates a stable condition. An additional desirable feature is the provision of a dial 46 of gauge assembly 12 which is manually rotatable thereupon, and the provision of a "sighting-in" method to eliminate any error in the starting zero reading. Before starting the step of digging a portion of the excavation, controls 138 are manipulated to locate sensor assembly 16 at approximately the elevation of gauge assembly 12; the elevation alignment of sensor assembly 16 and gauge assembly 12 is checked with sight level 144 and controls 138 are manipulated to reposition sensor assembly 16 until exact elevation alignment thereof is obtained; thereafter valve 26 is actuated to an open position and maintained in an open position until dial 46 of gauge assembly 12 indicates a stable condition; and thereafter dial 46 of gauge assembly 12 is manipulated to a zero setting, thereby eliminating any zero error.

While sensor elements 32, 332, 432, 632, and 732 have been described generally as entirely compliant, it will be obvious to those skilled in the diaphragm art that to serve the intended purpose only an intermediate portion thereof need be so compliant. In the sensor elements shown, the portions shown as either of U-shape or S-shape would be required to be entirely compliant so that the volume of the sensor assembly containing liquid 22 may expand or contract without stretching the sensor element itself.

In view of my invention and disclosures set forth above, other variations and modifications will become evident to others skilled in the art to obtain all or part of the benefits of my invention without copying the structures and methods shown, and I therefore claim all such variations insofar as they fall within the reasonable spirit and scope of my claims.

Having thus described my invention, what I claim as new and desire to secure by Letters Patent is:

1. A ruggedized hydrostatic altimeter for use in contour surveying comprising: a gauge assembly, said gauge assembly having an internal liquid volume,
   a casing,
   A displaceable pressure sensitive element connected to said casing, said element having an external surface and partially defining a first extended liquid volume and a second contracted liquid volume corresponding to a first positive pressure full scale internal pressure and a second negative pressure full scale internal pressure respectively, the difference in said first and second volumes being a gauge differential volume, and said external surface of said pressure sensitive element being exposed to ambient atmospheric pressure at all times,
   a liquid connector connected to said casing,
   an indicating movement assembly connected to said casing and correlated with said pressure sensitive element to indicate the displacement of said element from a zero pressure midpoint by the rotation of a rotatable pointer connected to said indicating movement assembly, and a dial assembly connected to said casing, said dial assembly including a dial concentric with the axis of rotation of said rotatable pointer;
   a sensor assembly, said sensor assembly having an internal liquid volume,
   a protective housing,
   a liquid connector connected to said housing, and at least a first displaceable pressure sensitive sensor element connected to said housing, said sensor element having at least one external surface exposed to the atmosphere and partially defining a first extended liquid volume and a second contracted liquid volume corresponding to a first full scale positive internal pressure and a second full scale negative internal pressure respectively, the difference in said first and second volumes of said sensor assembly being a sensor assembly differential volume and being equal to said gauge differential volume, said external surface of said pressure sensitive sensor element having at least an intermediate portion thereof exposed to the atmosphere, said intermediate surface being fully compliant to the extent that no substantial pressure is exerted on the system by the distortion of said pressure sensitive sensor element at any pressure between said full scale positive pressure and said full scale negative pressure, and said external surface of said pressure sensitive sensor element being exposed to ambient atmospheric pressure at all times;
   a length of flexible tubing connecting said connector of said gauge assembly to said connector of said sensor assembly; and
   said length of flexible tubing, and said internal liquid volumes of said gauge assembly and said sensor assembly being solid filled with an incompressible liquid having a specific gravity approximately that of water, and said dial of said gauge assembly being calibrated to register the elevation differential between said gauge assembly and said sensor assembly and equivalent to the hydrostatic pressure differential of a corresponding depth of said incompressible liquid, whereby the reading on said dial represents the true vertical distance between the elevation of said gauge assembly and the elevation of said sensor assembly.

2. A ruggedized hydrostatic altimeter for use in contour surveying comprising: a gauge assembly, said gauge assembly having an internal liquid volume,
   a casing,
   a displaceable pressure sensitive element connected to said casing, said element having an external surface and partially defining a first extended liquid volume and a second contracted liquid volume corresponding to a first positive pressure full scale internal pressure and a second negative pressure full scale internal pressure respectively, the difference in said first and second volumes being a gauge differential volume, and said external surface of said pressure sensitive element being exposed to ambient atmospheric pressure at all times,
   a liquid connector connected to said casing,
   an indicating movement assembly connected to said casing and correlated with said pressure sensitive element to indicate the displacement of said element from a zero pressure midpoint by the rotation of a rotatable pointer connected to said indicating movement assembly, and
   a dial ring assembly connected to said casing, said dial ring assembly including a compound dial concentric with the axis of rotation of said rotatable pointer;
a first sensor assembly, said sensor assembly having an internal liquid volume,
   a protective housing,
   a liquid connector connected to said housing, and
   at least a first displaceable pressure sensitive sensor element connected to said housing, said sensor element having an external surface and partially defining a first extended liquid volume and a second contracted liquid volume corresponding to a first full scale positive internal pressure and a second full scale negative internal pressure respectively, the difference in said first and second volumes of said sensor assembly being a sensor assembly differential volume and being equal to said gauge differential volume, said pressure sensitive sensor element has at least an intermediate portion thereof which is fully compliant to the extent that no substantial pressure is exerted on the system by the distortion of said pressure sensitive sensor element at any pressure between said full scale positive pressure and said full scale negative pressure,
   and said external surface of said pressure sensitive sensor element being exposed to ambient atmospheric pressure at all times, a second pressure sensor assembly including a second displaceable pressure sensitive sensor element and said second element is similar to said first element and symmetrically positioned with respect thereto;
a length of flexible tubing connecting said connector of said gauge assembly to said connector of said sensor assembly; and
said length of flexible tubing, and said internal liquid volumes of said gauge assembly and said sensor assembly being solid filled with an incompressible liquid having a specific gravity approximately that of water, and said dial of said gauge assembly being calibrated to register the elevation differential between said gauge assembly and said sensor assembly and equivalent to the hydrostatic pressure differential of a corresponding depth of said imcompressible liquid, whereby the reading on said dial represents the true vertical distance between the elevation of said gauge assembly and the elevation of said sensor assembly.

3. The combination as set forth in claim 2 wherein said tubing includes length markings along the entire length thereof, and said sensor assembly protective housing includes a surface from which said markings of said tubing are initiated, whereby said sensor assembly together with said tubing may function as an accurate flexible surveying tape.

4. The combination of claim 3 wherein said gauge assembly includes a low-pressure, normally-closed, liquid valve means connected to said casing, said valve means being manually actuatable to an open position, being solid filled with said incompressible liquid, and when open, being in direct liquid communication with said tubing and said displaceable pressure sensitive element of said gauge assembly, whereby the delicate portions of said gauge assembly are isolated from liquid pressure fluctuations in said tubing whenever said valve means is in a normally-closed position.

5. The combination as set forth in claim 1 wherein said tubing includes length markings along the entire length thereof, and said sensor assembly protective housing includes a surface from which said markings of said tubing are initiated, whereby said sensor assembly together with said tubing may function as an accurate flexible surveying tape.

6. The combination of claim 5 wherein said protective housing of said sensor assembly has a portion adjacent said liquid connector having a faired generally arrow-shaped configuration with the point of said arrow-shaped configuration directed toward the adjacent portion of said flexible tubing and centered thereupon, whereby said sensor assembly may be pulled by said tubing through dense underbrush and over rough terrain without snagging or excessive stress upon said tubing.

7. The combination of claim 5 wherein said gauge assembly includes a low-pressure, normally-closed, liquid valve means connected to said casing, said valve means being manually actuatable to an open position, being solid filled with said incompressible liquid, and when open, being in direct liquid communication with said tubing and said displaceable pressure sensitive element of said gauge assembly, whereby the delicate portions of said gauge assembly are isolated from liquid pressure fluctuations in said tubing whenever said valve means is in a normally-closed position.

8. The combination of claim 7 wherein said protective housing of said sensor assembly has a portion adjacent said liquid connector having a faired generally arrow-shaped configuration with the point of said arrow-shaped configuration directed toward the adjacent portion of said flexible tubing and centered thereupon, whereby said sensor assembly may be pulled by said tubing through dense underbrush and over rough terrain without snagging or excessive stress upon said tubing.

9. The combination of claim 1 wherein said gauge assembly includes a low-pressure, normally-closed, liquid valve means connected to said casing, said valve means being manually actuatable to an open position, being solid filled with said incompressible liquid, and when open, being in direct liquid communication with said tubing and said displaceable pressure sensitive element of said gauge assembly, whereby the delicate portions of said gauge assembly are isolated from liquid pressure fluctuations in said tubing whenever said valve means is in a normally-closed position; and wherein said protective housing of said sensor assembly has a portion adjacent said liquid connector having a faired generally arrow-shaped configuration with the point of said arrow-shaped configuration directed toward the adjacent portion of said flexible tubing and centered thereupon, whereby said sensor assembly may be pulled by said tubing through dense underbrush and over rough terrain without snagging or excessive stress upon said tubing.

10. The combination of claim 1 wherein said gauge assembly includes a low-pressure, normally-closed, liquid valve means connected to said casing, said valve means being manually actuatable to an open position, being solid filled with said incompressible liquid, and when open, being in direct liquid communication with said tubing and said displaceable pressure sensitive element of said gauge assembly, whereby the delicate portions of said gauge assembly are isolated from liquid pressure fluctuations in said tubing whenever said valve means is in a normally-closed position; and wherein said sensor assembly includes a second displaceable pressure sensitive sensor element and said second element is similar to said first element and symmetrically positioned with respect thereto.

11. The combination of claim 10 wherein said protective housing of said sensor assembly has a portion adjacent said liquid connector having a faired generally arrow-shaped configuration with the point of said arrow-shaped configuration directed toward the adjacent portion of said flexible tubing and centered thereupon, whereby said sensor assembly may be pulled by said tubing through dense underbrush and over rough terrain without snagging or excessive stress upon said tubing.

12. The combination of claim 1 wherein said protective housing of said sensor assembly has a portion adjacent said liquid connector having a faired generally arrow-shaped configuration with the point of said arrow-shaped configuration directed toward the adjacent portion of said flexible tubing and centered thereupon, whereby said sensor assembly may be pulled by said tubing through dense underbrush and over rough terrain without snagging or excessive stress upon said tubing.

13. The combination of claim 12 wherein said sensor assembly includes a second displaceable pressure sensitive sensor element and said second element is similar to said first element and symmetrically positioned with respect thereto.

14. The combination as set forth in claim 13 wherein said tubing includes length markings along the entire length thereof, and said sensor assembly protective housing includes a surface from which said markings of said tubing are initiated, whereby said sensor assembly together with said tubing may function as an accurate flexible surveying tape.

15. The combination of claim 14 wherein said gauge assembly includes a low-pressure, normally-closed, liquid valve means connected to said casing, said valve means being manually actuatable to an open position, being solid filled with said incompressible liquid, and when open, being in direct liquid communication with said tubing and said displaceable pressure sensitive element of said gauge assembly, whereby the delicate portions of said gauge assembly are isolated from liquid pressure fluctuations in said tubing whenever said valve means is in a normally-closed position.

16. A ruggedized hydrostatic altimeter for use with excavation equipment comprising:

a gauge assembly, said gauge assembly having an internal liquid volume, a casing, a displaceable pressure sensitive element connected to said casing, said element having an external surface and partially defining a first extended liquid volume and a second contracted liquid volume corresponding to a first zero scale internal pressure and a second full scale internal pressure respectively, the difference in said first and second volumes is a gauge differential volume, and said external surface of said pressure sensitive element is exposed to ambient atmospheric pressure at all times, a liquid connector connected to said casing, an indicating movement assembly connected to said casing and correlated with said pressure sensitive element to indicate the displacement of said element by the rotation of a rotatable pointer connected to said indicating movement assembly, and a dial ring assembly including a dial concentric with the axis of rotation of said rotatable pointer;

a sensor assembly, said sensor assembly having an internal liquid volume, a protective housing, a liquid connector connected to said housing, and at least a first displaceable pressure sensitive sensor element connected to said housing, said sensor element having at least one external surface exposed to the atmosphere and partially defining a first extended liquid volume and a second contracted liquid volume corresponding to a first full scale internal pressure and a second zero scale internal pressure respectively, the difference in said first and second volumes of said sensor assembly being a sensor assembly differential volume and being equal to said gauge differential volume, said external surface of said pressure sensitive sensor element having at least an intermediate portion thereof exposed to the atmosphere, said intermediate external surface being fully compliant to the extent that no substantial pressure is exerted on the system by the distortion of said pressure sensitive sensor element at any pressure between said full scale pressure and said zero pressure, and said external surface of said pressure sensitive sensor element being exposed to ambient atmospheric pressure at all times;

a length of flexible tubing connecting said connector of said gauge assembly to said connector of said sensor assembly; and said length of flexible tubing, and said internal liquid volumes of said gauge assembly and said sensor assembly being solid filled with an incompressible liquid having a specific gravity approximately that of water, and said dial of said gauge assembly being calibrated to register the elevation differentials between said gauge assembly and said sensor assembly and equivalent to the hydrostatic pressure differential of a corresponding depth of said imcompressible liquid, whereby the reading on said dial represents the true vertical distance between the elevation of said gauge assembly and the elevation of said sensor assembly.

17. A ruggidized hydrostatic altimeter for use with excavation equipment comprising:

a gauge assembly, said gauge assembly having an internal liquid volume,
  a casing,
  a displaceable pressure sensitive element connected to said casing, said element having an external surface and partially defining a first extended liquid volume and a second contracted liquid volume corresponding to a first zero scale internal pressure and a second full scale internal pressure respectively, the difference in said first and second volumes is a gauge differential volume, and said external surface of said pressure sensitive element is exposed to ambient atmospheric pressure at all times,
  a liquid connector connected to said casing,
  an indicating movement assembly connected to said casing and correlated with said pressure sensitive element to indicate the displacement of said element by the rotation of a rotatable pointer connected to said indicating movement assembly, and
  a dial ring assembly including a dial concentric with the axis of rotation of said rotatable pointer;

a sensor assembly, said sensor assembly having an internal liquid volume,
  a protective housing,
  a liquid connector connected to said housing, and
  at least a first displaceable pressure sensitive sensor element connected to said housing, said sensor element having at least one external surface exposed to the atmosphere and partially defining a first extended liquid volume and a second contracted liquid volume corresponding to a first full scale internal pressure and a second zero scale internal pressure respectively, the difference in said first and second volumes of said sensor assembly being a sensor assembly differential volume and being equal to said gauge differential volume, said external surface of said pressure sensitive sensor element having at least an intermediate portion thereof exposed to the atmosphere, said intermediate external surface being fully compliant to the extent that no substantial pressure is exerted on the system by the distortion of said pressure sensitive sensor element at any pressure between said full scale pressure and said zero pressure, and said external surface of said pressure sensitive sensor element being exposed to ambient atmospheric pressure at all times;

a length of flexible tubing connecting said connector of said gauge assembly to said connector of said sensor assembly; and said length of flexible tubing, and said internal liquid volumes of said gauge assembly and said sensor assembly being solid filled with an incompressible liquid having a specific gravity approximately that of water, and said dial of said gauge assembly being calibrated to register the elevation differentials between said gauge assembly and said sensor assembly and equivalent to the hydrostatic pressure differential of a corresponding depth of said incompressible liquid, whereby the reading on said dial represents the true vertical distance between the elevation of said gauge assembly and the elevation of said sensor assembly; and wherein said gauge has a portion having the configuration of a body revolution, said dial ring assembly has a portion mating with said body of revolution portion of said gauge assembly and in frictional engagement therewith, and said dial ring assembly is readily rotatable on said gauge assembly by manual manipulation; and wherein said sensor assembly includes a second displaceable pressure sensitive sensor element and said second element is similar to said first element and symmetrically positioned with respect thereto.

18. The combination of claim 17 wherein said gauge assembly includes a low-pressure, normally-closed, liquid valve means connected to said casing, said valve means being manually actuatable to an open position, being solid filled with said incompressible liquid, and when open, being in direct liquid communication with said tubing and said displaceable pressure sensitive element of said gauge assembly, whereby the delicate portions of said gauge assembly are isolated from liquid pressure fluctuations in said tubing whenever said valve means is in a normally-closed position.

19. The combination of claim 17 wherein said sensor assembly includes a second displaceable pressure sensitive sensor element and said second element is similar to said first element and symmetrically positioned with respect thereto.

20. The combination of claim 19 wherein said gauge assembly includes a low-pressure, normally-closed, liquid valve means connected to said casing, said valve means being manually actuatable to an open position, being solid filled with said incompressible liquid, and when open, being in direct liquid communication with said tubing and said displaceable pressure sensitive element of said gauge assembly, whereby the delicate portions of said gauge assembly are isolated from liquid pressure fluctuations in said tubing whenever said valve means is in a normally-closed position.

21. An excavation machine comprising:

a machine body structure, an operator station on said body structure, a boom connected to said body structure, a dipper stick pivoted to said boom, a bucket pivoted to said dipper stick by a bucket pivot, and controls operable from said operator station for manipulating said dipper stick and said bucket; and a ruggedized hydrostatic altimeter mounted on said machine, said hydrostatic altimeter including, a gauge assembly mounted on said body structure within sight and manipulation distance of said operator station, said gauge assembly having an internal liquid volume, a casing, a displaceable pressure sensitive element connected to said casing, said element having an external surface and partially defining a first extended liquid volume and a second contracted liquid volume corresponding to a first zero scale internal pressure and a second full scale internal pressure respectively, the difference in said first and second volumes is a gauge differential volume, and said external surface of said pressure sensitive element is exposed to ambient atmospheric pressure at all times, a liquid connector connected to said casing, an indicating movement assembly connected to said casing and correlated with said pressure sensitive element to indicate the displacement of said element by the rotation of a rotatable pointer connected to said indicating movement assembly, and a dial ring assembly connected to said casing, said dial ring assembly including a dial concentric with the axis of rotation of said rotatable pointer;

a sensor assembly mounted on said dipper stick immediately adjacent said bucket pivot, said sensor assembly having an internal liquid volume, a protective housing, a liquid connector connected to said housing, and at least a first displaceable pressure sensitive sensor element connected to said housing, said sensor element having at least one external surface exposed to the atmosphere and partially defining a first extended liquid volume and a second contracted liquid volume corresponding to a first full scale internal pressure and a second zero scale internal pressure respectively, the difference in said first and second volumes of said sensor assembly being a sensor assembly differential volume and being equal to said gauge differential volume, said external surface of said pressure sensitive sensor element having at least an intermediate portion thereof exposed to the atmosphere, said intermediate external surface being fully compliant to the extent that no substantial pressure is exerted on the system by the distortion of said pressure sensitive sensor element at any pressure between said full scale pressure and said zero scale pressure, and said external surface of said pressure sensitive sensor element being exposed to ambient atmospheric pressure at all times;

a length of flexible tubing connecting said connector of said gauge assembly to said connector of said sensor assembly and secured to the adjacent parts of said machine at points along its length to prevent whipping and snagging; and said length of flexible tubing, and said internal liquid volumes of said gauge assembly and said sensor assembly being solid filled with an incompressible liquid have a specific gravity approximately that of water, and said dial of said gauge assembly being calibrated to register the elevation differential between said gauge assembly and said sensor assembly and equivalent to the hydrostatic pressure differential of a corresponding depth of said incompressible liquid, whereby the reading on said dial represents the true vertical distance between the elevation of said gauge assembly and the elevation of said sensor assembly.

22. An excavation machine comprising:

a machine body structure, an operator station on said body structure, a boom connected to said body structure, a dipper stick pivoted to said boom, a bucket pivoted to said dipper stick by a bucket pivot, and controls operable from said operator station for manipulating said dipper stick and said bucket; and a ruggedized hydrostatic altimeter mounted on said machine, said hydrostatic altimeter including, a gauge assembly mounted on said body structure within sight and manipulation distance of said operator station, said gauge assembly having an internal liquid volume, a casing, a displaceable pressure sensitive element connected to said casing, said element having an external surface and partially defining a first extended liquid volume and a second contracted liquid volume corresponding to a first zero scale internal pressure and a second full scale internal pressure respectively, the difference in said first and second volumes is a gauge differential volume, and said external surface of said pressure sensitive element is exposed to ambient atmospheric pressure at all times, a liquid connector connected to said casing, an indicating movement assembly connected to said casing and correlated with said pressure sensitive element to indicate the displacement of said element by the rotation of a rotatable pointer connected to said indicating movement assembly, and a dial ring assembly connected to said casing, said dial ring assembly including a dial concentric with the axis of rotation of said rotatable pointer;

a sensor assembly mounted on said dipper stick immediately adjacent said bucket pivot, said sensor assembly having an internal liquid volume, a protective housing, a liquid connector connected to said housing, and at least a first displaceable pressure sensitive sensor element connected to said housing, said sensor element having at least one external surface exposed to the atmosphere and partially defining a first extended liquid volume and a second contracted liquid volume corresponding to a first full scale internal pressure and a second zero scale internal pressure respectively, the difference in said first and second volumes of said sensor assembly being a sensor assembly differential volume and being equal to said gauge differential volume, said external surface of said pressure sensitive sensor element having at least an intermediate portion thereof exposed to the atmosphere, said intermediate external surface being fully compliant to the extent that no substantial pressure is exerted on the system by the distortion of said pressure sensitive sensor element at any pressure between said full scale pressure and said zero scale pressure, and said external surface of said pressure sensitive sensor element being exposed to ambient atmospheric pressure at all times;

a length of flexible tubing connecting said connector of said gauge assembly to said connector of said sensor assembly and secured to the adjacent parts of said machine at points along its length to prevent whipping and snagging; and said length of flexible tubing, and said internal liquid volumes of said gauge assembly and said sensor assembly being solid filled with an incompressible liquid have a specific gravity approximately that of water, and said dial of said gauge assembly being calibrated to register the elevation differential between said gauge assembly and said sensor assembly and equivalent to the hydrostatic pressure differential of a corresponding depth of said incompressible liquid, whereby the reading on said dial represents the true vertical distance between the elevation of said gauge assembly and the elevation of said sensor assembly wherein said sensor assembly includes a second displaceable pressure sensitive sensor element and said second element is similar to said first element and symmetrically positioned with respect thereto.

23. The combination of claim 22 wherein said gauge assembly includes a low-pressure, normally-closed, liquid valve means connected to said casing, said valve means being manually actuatable to an open position, being solid filled with said incompressible liquid, and when open, being in direct liquid communication with said tubing and said displaceable pressure sensitive element of said gauge assembly, whereby the delicate portions of said gauge assembly are isolated from liquid pressure fluctuations in said tubing whenever said valve means is in a normally-closed position.

24. The combination as set forth in claim 23 wherein said gauge assembly has a portion having the configuration of a body of revolution, said dial ring assembly has a portion mating with said body of revolution portion of said gauge assembly and in frictional engagement therewith, and said dial ring assembly is readily rotatable on said gauge assembly by manual manipulation.

25. An excavation machine comprising:

a machine body structure, an operator station on said body structure, a boom connected to said body structure, a dipper stick pivoted to said boom, a bucket pivoted to said dipper stick by a bucket pivot, and controls operable from said operator station for manipulating said dipper stick and said bucket; and a ruggedized hydrostatic altimeter mounted on said machine, said hydrostatic altimeter including, a gauge assembly mounted on said body structure within sight and manipulation distance of said operator station, said gauge assembly having an internal liquid volume, a casing, a displaceable pressure sensitive element connected to said casing, said element having an external surface and partially defining a first extended liquid volume and a second contracted liquid volume corresponding to a first zero scale internal pressure and a second full scale internal pressure respectively, the difference in said first and second volumes is a gauge differential volume, and said external surface of said pressure sensitive element is exposed to ambient atmospheric pressure at all times, a liquid connector connected to said casing, an indicating movement assembly connected to said casing and correlated with said pressure sensitive element to indicate the displacement of said element by the rotation of a rotatable pointer connected to said indicating movement assembly, and a dial ring assembly connected to said casing, said dial ring assembly including a dial concentric with the axis of rotation of said rotatable pointer;

a sensor assembly mounted on said dipper stick immediately adjacent said bucket pivot, said sensor assembly having an internal liquid volume, a protective housing, a liquid connector connected to said housing, and at least a first displaceable pressure sensitive sensor element connected to said housing, said sensor element having at least one external surface exposed to the atmosphere and partially defining a first extended liquid volume and a second contracted liquid volume corresponding to a first full scale internal pressure and a second zero scale internal pressure respectively, the difference in said first and second volumes of said sensor assembly being a sensor assembly differential volume and being equal to said gauge differential volume, said external surface of said pressure sensitive sensor element having at least an intermediae portion thereof exposed to the atmosphere, said intermediate external surface being fully compliant to the extent that no substantial pressure is exerted on the system by the distortion of said pressure sensitive sensor element at any pressure between said full scale pressure and said zero scale pressure, and said external surface of said pressure sensitive sensor element being exposed to ambient atmospheric pressure at all times;

a length of flexible tubing connecting said connector of said gauge assembly to said connector of said sensor assembly and secured to the adjacent parts of said machine at points along its length to prevent whipping and snagging; and said length of flexible tubing, and said internal liquid volumes of said gauge assembly and said sensor assembly being solid filled with an incompressible liquid have a specific gravity approximately that of water, and said dial of said gauge assembly being calibrated to register the elevation differential between said gauge assembly and said sensor assembly and equivalent to the hydrostatic pressure differential of a corresponding depth of said incompressible liquid, whereby the reading on said dial represents the true vertical distance between the elevation of said gauge assembly and the elevation of said sensor assembly; and wherein said gauge assembly has a portion having the configuration of a body of revolution, said dial ring assembly has a portion mating with said body of revolution portion of said gauge assembly and in frictional engagement therewith, and said dial ring assembly is readily rotatable on said gauge assembly by manual manipulation and wherein said sensor assembly includes a second displaceable pressure sensitive sensor element and said second element is similar to said first element and symmetrically positioned with respect thereto.

26. The method of surveying to determine elevation differentials utilizing a ruggedized hydrostatic altimeter, said altimeter comprising a compound liquid pressure gauge having an internal liquid volume, a normally-closed manually operable valve connected to and immediately adjacent to said gauge, a sensor assembly having an internal liquid volume, a length of flexible tubing connecting said valve and said sensor assembly, and incompressible liquid filling said valve, said tubing, and said internal volumes of said gauge and said sensor assembly; comprising the steps of positioning said sensor assembly at a first location at a first elevation;

positioning said gauge and said valve at a second location at a second elevation, said second location being a substantial horizontal distance from said first location;

manually operating said valve to an open position and maintaining said open position at least until said gauge indicates a stable condition; and thereafter reading said gauge, thereby obtaining a true reading representing the elevation differential between said first elevation and said second elevation; and including the additional steps of relocating said sensor assembly from said first location to said second location by pulling on said tubing until said sensor assembly is obtained;

positioning said sensor assembly at said second location at said second elevation;

repositioning said gauge and said valve at a third location at a third elevation, said third location being a substantial horizontal distance from both said first location and said second location;

manually operating said valve to an open position and maintaining said open position at least until said gauge indicates a stable condition;

thereafter reading said gauge, thereby obtaining a true reading representing the elevation differential between said second elevation and said third elevation; and adding the readings of said gauge obtained at said second location and at said third location to obtain the elevation differential between said first elevation and said third elevation.

27. The method as set forth in claim 26 wherein said tubing includes length markings along the entire length thereof and including the additional steps:

while said sensor assembly is at said first location and said gauge is at said second location;

manually operating said valve to an open position;

maintaining said valve in said open position and maintaining said first location and said second location while repositioning vertically at least one of said gauge and said sensor assembly until said gauge and said sensor assembly are repositioned to a first same elevation as indicated by a zero reading on said gauge;

while maintaining said first same elevation for said gauge and said sensor assembly, stretching said tubing taut at said first same elevation and reading said length markings thereon, thereby obtaining a true horizontal distance reading between said first location and said second location;

while said sensor assembly is at said second location and said gauge is at said third location;

manually operating said valve to an open position;

maintaining said valve in said open position and maintaining said second location and said third location while repositioning vertically at least one of said gauge and said sensor assembly until said gauge and said sensor assembly are repositioned to a second same elevation as indicated by a zero reading on said gauge;

while maintaining said second same elevation for said gauge and said sensor assembly, stretching said tubing taut at said second same elevation and reading said length markings thereon, thereby obtaining a true horizontal distance reading between said second location and said third location; and adding the readings of said length markings on said tubing taken at said second location and at said third location to obtain the total horizontal distance between said first location and said third location.

28. The method of surveying to determine elevation differentials utilizing a ruggedized hydrostatic altimeter, said altimeter comprising a compound liquid pressure gauge having an internal liquid volume, a normally-closed manually operable valve connected to and immediately adjacent to said gauge, a sensor assembly having an internal liquid volume, a length of flexible tubing connecting said valve and said sensor assembly, and incompressible liquid filling said valve, said tubing, and said internal volumes of said gauge and said sensor assembly: comprising the steps of positioning said sensor assembly at a first location at a first elevation;

positioning said gauge and said valve at a second location at a second elevation, said second location being a substantial horizontal distance from said first location;

manually operating said valve to an open position and maintaining said open position at least until said gauge indicates a stable condition; and thereafter reading said gauge, thereby obtaining a true reading representing the elevation differential between said first elevation and said second elevation; and including the additional steps of relocating said sensor assembly from said first location to said second location;

positioning said sensor assembly at said second location at said second elevation;

repositioning said gauge and said valve at a third location at a third elevation, said third location being a substantial horizontal distance from both said first location and said second location;

manually operating said valve to an open position and maintaining said open position at least until said gauge indicates a stable condition;

thereafter reading said gauge, thereby obtaining a true reading representing the elevation differential between said second elevation and said third elevation; and adding the readings of said gauge obtained at said second location and at said third location to obtain the elevation differential between said first elevation and said third elevation; and wherein said tubing includes length markings along the entire length thereof and including the additional steps while said sensor assembly is at said first location and said gauge is at said second location of manually operating said valve to an open position;

maintaining said valve in said open position and maintaining said first location and said second location while repositioning vertically at least one of said gauge and said sensor assembly until said gauge and said sensor assembly are repositioned to a first same elevation as indicated by a zero reading on said gauge;

while maintaining said first same elevation for said gauge and said sensor assembly, stretching said tubing taut at said first same elevation and reading said length markings thereon, threby obtaining a true horizontal distance reading between said first location and said second location;

while said sensor assembly is at said second location and said gauge is at said third location, manually operating said valve to an open position;

maintaining said valve in said open position and maintaining said second location and said third location while repositioning vertically at least one of said gauge and said sensor assembly until said gauge and said sensor assembly are repositioned to a second same elevation as indicated by a zero reading on said gauge;

while maintaining said second same elevation for said gague and said sensor assembly, stretching said tubing taut at said second same elevation and reading said length markings thereon, thereby obtaining a true horizontal distance reading between said second location and said third location; and adding the readings of said length markings on said tubing taken at said second location and at said third location to obtain the total horizontal distance between said first location and said third location.

29. The method as set forth in claim 26 wherein said tubing includes length markings along the entire length thereof and including the additional steps:

manually operating said valve to an open position;

maintaining said valve in said open position and maintaining said first location and said second location while repositioning vertically at least one of said gauge and said sensor assembly until said gauge and said sensor assembly are repositioned to the same elevation as indicated by a zero reading on said gauge; and while maintaining said same elevation for said gauge and said sensor assembly, stretching said tubing taut at said same elevation and reading said length markings thereon, thereby obtaining a true horizontal distance reading between said first location and said second location.

30. The method of depth determination during excavation operations comprising:

providing an excavation machine having an operator station, a boom connected to said machine, a dipper stick pivoted to said boom, a bucket pivoted to said dipper stick by a bucket pivot, and controls operable from said operator station for manipulating said dipper stick, and said bucket;

providing a ruggedized hydrostatic altimeter mounted on said machine, said hydrostatic altimeter comprising a liquid pressure gauge assembly having an internal liquid volume mounted on said machine within sight and manipulation distance of said operator station, said gauge assembly having a manually rotatable dial assembly, a sensor assembly having an internal liquid volume mounted on said dipper stick immediately adjacent said bucket pivot, a length of flexible tubing connecting said gauge assembly to said sensor assembly and secured to the adjacent parts of said machine at points along its length to prevent whipping and snagging, and said tubing, and said internal volumes of said gauge assembly and said sensor assembly being solid filled with an incompressible liquid having a specific gravity approximately that of water;

providing a predetermined line adjacent to a desired excavation from which to measure the desired depth of excavation;

digging a portion of an excavation with said machine;

manipulating said controls to position said bucket in a first rotary position at a first location and at a first elevation with a portion of said bucket at the elevation of said predetermined line, and while maintaining said first rotary position, said first location, and said first elevation, manipulating said dial assembly of said gauge assembly to a zero setting;

manipulating said controls to reposition said bucket to a second rotary position in which said portion of said bucket is parallel to said portion of said bucket while in said first rotary position and at a second elevation vertically in line with and below said first location with said portion of said bucket resting on the bottom of said excavation; and while maintaining said second rotary position and said second elevation, reading said dial assembly of said gauge assembly to directly determine the depth of said excavation from said predetermined line.

31. The method as set forth in claim 30 wherein said predetermined line is the adjacent surface of the earth at the edge of said excavation and wherein said portion of said bucket rests on said surface of the earth at said first elevation.

32. The method as set forth in claim 30 wherein said predetermined line is a grade line positioned adjacent one edge of said desired excavation and wherein said portion of said bucket touches said grade line at said first elevation.

33. The method of depth determination during excavation operations comprising:

providing an excavation machine having an operator station, a boom connected to said machine, a dipper stick pivoted to said boom, a bucket pivoted to said dipper stick by a bucket pivot, and controls operable from said operator station for manipulating said dipper stick, and said bucket;

providing a ruggedized hydrostatic altimeter mounted on said machine, said hydrostatic altimeter comprising: a liquid pressure gauge assembly having an internal liquid volume mounted on said machine within sight and manipulation distance of said operator station, said gauge assembly having a dial; a sensor assembly having an internal liquid volume mounted on said dipper stick immediately adjacent said bucket pivot; a length of flexible tubing connecting said gauge assembly to said sensor assembly and secured to the adjacent parts of said machine at points along its length to prevent whipping and snagging; and said tubing, and said internal volumes of said gauge assembly and said sensor assembly being solid filled with an incompressible liquid having a specific gravity approximately that of water;

providing a calibrated measuring stick and a hand held sight level;

providing a stationary predetermined reference elevation point within sight of a desired excavation;

digging a portion of an excavation with said machine;

manipulating said controls to locate said bucket with the bottom thereof on the bottom of said excavation and to rotate said bucket to a predetermined rotary position wherein said bottom of said bucket is a known vertical distance below said sensor assembly, and while maintaining said bucket in said rotary position on the bottom of said excavation, reading said dial of said gauge assembly to directly determine the vertical displacement distance from said sensor assembly to said gauge assembly;

placing said measuring stick in a vertical position with the lower end on said dial of said gauge assembly;

placing said level adjacent said stick and sighting therethrough to position said level perpendicular to said stick and at the level of said reference elevation point;

reading said calibrated stick to determine the vertical remaining distance from said dial of said gauge assembly to said reference elevation point; and adding said known vertical distance, said vertical displacement distance, and said vertical remaining distance to determine the true depth of the bottom of said excavation from said reference elevation point.

34. The method as set forth in claim 33 wherein said gauge assembly includes a manually actuatable, normally-closed valve adjacent said dial, and including the following steps:

immediately prior to reading said dial of said gauge assembly, actuating said valve to an open position and maintaining said open position at least until said dial of said gauge assembly indicates a stable condition.

35. The method as set forth in claim 34 wherein said dial of said gauge assembly is manually rotatable, and including the following steps:

before starting the step of digging a portion of said excavation, manipulating said controls to locate said sensor assembly at approximately the elevation of said gauge assembly;

checking the elevation alignment of said sensor assembly and said gauge assembly with said sight level and manipulating said controls to reposition said sensor assembly until exact elevation alignment thereof is obtained;

thereafter actuating said valve to an open position and maintaining said open position at least until said dial of said gauge assembly indicates a stable condition; and thereafter manipulating said dial of said gauge assembly to a zero setting.

36. The method as set forth in claim 33 wherein said dial of said gauge assembly is manually rotatable, and including the following steps:

before starting the step of digging a portion of said excavation, manipulating said controls to locate said sensor assembly at approximately the elevation of said gauge assembly;

checking the elevation alignment of said sensor assembly and said gauge assembly with said sight level and manipulating said controls to reposition said sensor assembly until exact elevation alignment thereof is obtained;

thereafter actuating said valve to an open position and maintaining said open position at least until said dial of said gauge assembly indicates a stable condition; and thereafter manipulating said dial of said gauge assembly to a zero setting.

37. A ruggedized hydrostatic altimeter apparatus for use in measuring elevation differentials in contour surveying, excavation equipment and the like comprising:

a gauge assembly, said gauge assembly having an internal liquid volume, a casing, a displaceable pressure sensitive element connected to said casing, said element having an external surface and partially difining a first extended liquid volume and a second contracted liquid volume corresponding to a first positive pressure full scale internal pressure and a second negative pressure full scale internal pressure respectively, the difference in said first and second volumes being a gauge differential volume, and said external surface of said pressure sensitive element being exposed to ambient atmospheric pressure at all times, a liquid connector connected to said casing, a dial means having indicia thereon, an indicating movement assembly connected to said casing and correlated with said pressure sensitive element to indicate the displacement of said element from a predetermined pressure point by the rotation of a rotatable pointer relative to said dial, said pointer being connected to said indicating movement assembly, and a sensor assembly, said sensor assembly having an internal liquid volume, a protective housing, a liquid connector connected to said housing, and at least a first displaceable pressure sensitive sensor element connected to said housing, said sensor element having at least one external surface exposed to the atmosphere and partially defining a first extended liquid volume and a second contracted liquid volume corresponding to a first full scale positive internal pressure and a second full scale negative internal pressure respectively, the difference in said first and second volumes of said sensor assembly being a sensor assembly differential volume and being equal to said gauge differential volume, said external surface of said pressure sensitive sensor element having at least an intermediate portion thereof exposed to the atmosphere, said intermediate external surface being fully compliant to the extent that no substantial pressure is exerted on the system by the distortion of said pressure sensitive sensor element at any pressure between said full scale positive pressure and said full scale negative pressure, and said external surface of said pressure sensitive sensor element being exposed to ambient atmospheric pressure at all times;

a length of flexible tubing connecting said connector of said gauge assembly to said connector of said sensor assembly; and said length of flexible tubing, and said internal liquid volumes of said gauge assembly and said sensor assembly being solid filled with an incompressible liquid having a specific gravity approximately that of water, and said dial of said gauge assembly being calibrated to register the elevation differential between said gauge assembly and said sensor assembly and equivalent to the hydrostatic pressure differential of a corresponding depth of said incompressible liquid, whereby the reading on said dial represents the true vertical distance between the elevation of said gauge assembly and the elevation of said sensor assembly.

* * * * *